H. J. FRIES.
HOLDER AND STERILIZER FOR DENTAL BURS.
APPLICATION FILED JUNE 5, 1913.
1,104,650.
Patented July 21, 1914.
2 SHEETS—SHEET 1.
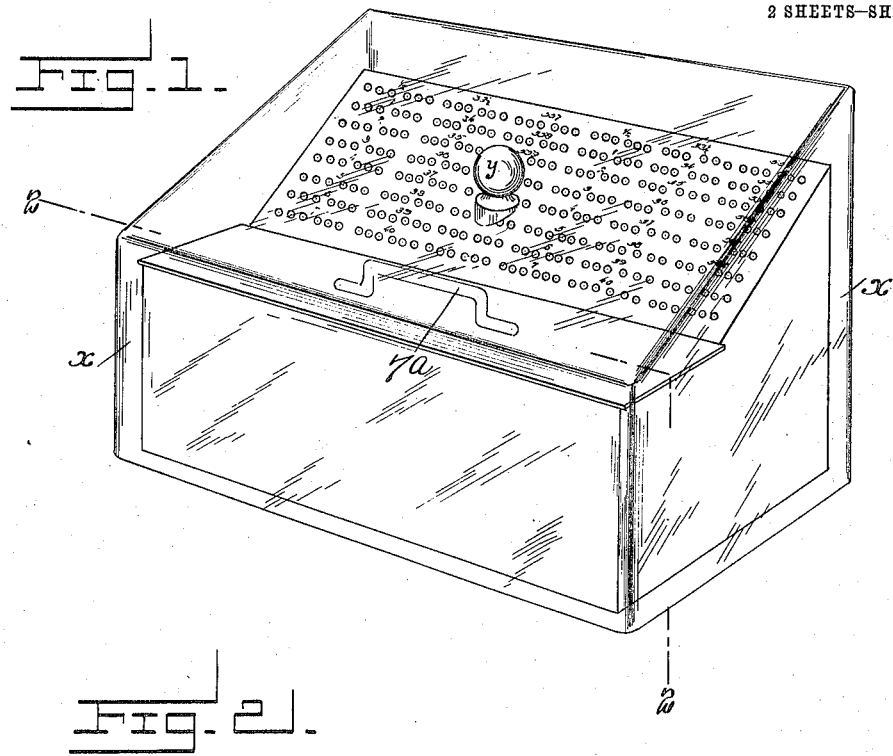
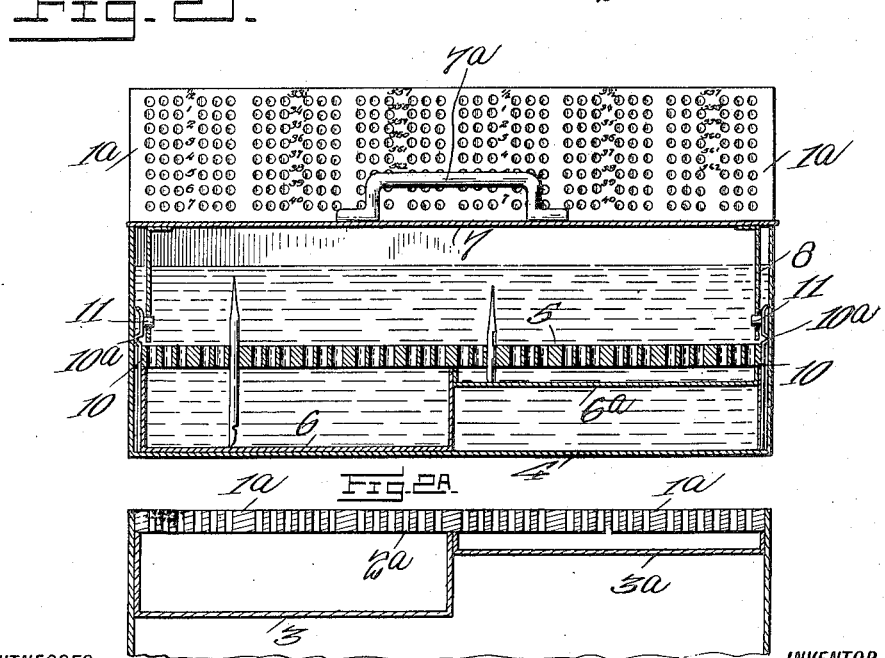
WITNESSES
INVENTOR
HOWARD J. FRIES,
BY Munn & Co.
ATTORNEYS H. J. FRIES.
HOLDER AND STERILIZER FOR DENTAL BURS.
APPLICATION FILED JUNE 5, 1913.
1,104,650.
Patented July 21, 1914.
2 SHEETS—SHEET 2.
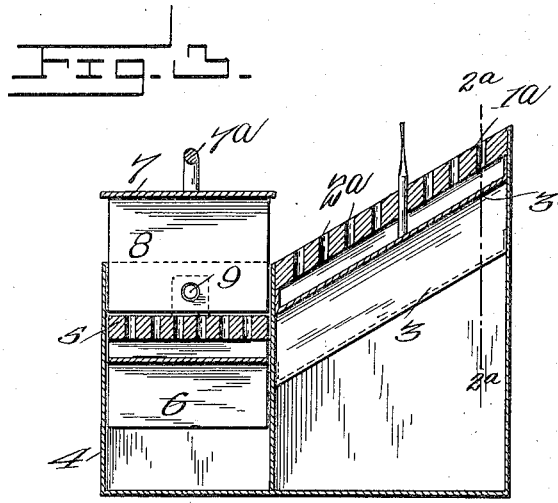
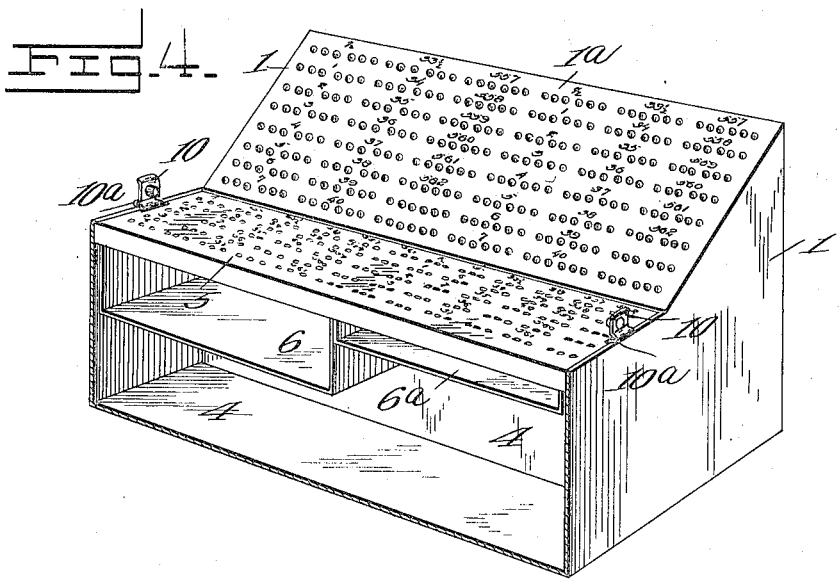
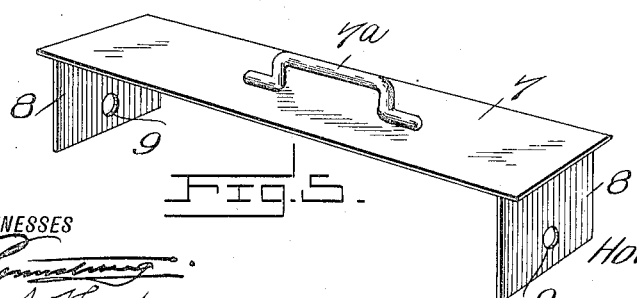
WITNESSES
INVENTOR
HOWARD J. FRIES,
BY
ATTORNEYS

UNITED STATES PATENT OFFICE.

HOWARD JOHNSON FRIES, OF SEATTLE, WASHINGTON.

HOLDER AND STERILIZER FOR DENTAL BURS.

1,104,650.    Specification of Letters Patent.    Patented July 21, 1914.

Application filed June 5, 1913. Serial No. 771,944.

*To all whom it may concern:*

Be it known that I, HOWARD J. FRIES, a citizen of the United States, and a resident of Seattle, in the county of King and State of Washington, have invented an Improved Holder and Sterilizer for Dental Burs, of which the following is a specification.

My invention comprises two principal but intimately related parts, namely, a holder proper for burs or drills kept in stock and a combined tray, or holder, and sterilizer for such burs or drills as the dentist may require for immediate use.

The details of construction, arrangement, and operation of parts are as hereinafter described and illustrated in the accompanying drawings, in which—

Figure 1 is a perspective view of the complete apparatus inclosed in a removable glass case or cover. Fig. 2 is a longitudinal section on the line 2—2 of Fig. 1. Fig. 2ª is a vertical section on the line 2ª—2ª of Fig. 3. Fig. 3 is a vertical cross section of the apparatus. Fig. 4 is a sectional perspective of the apparatus, the front wall of the sterilizing tank being removed. Fig. 5 is a perspective view of the lid or cover for the sterilizing tank or compartment and which also serves as a lifter for the tray or bur holder forming an attachment of such tank.

The apparatus will ordinarily be provided with a glass cover, or protecting case, *x*, as shown in Fig. 1, the same being open at the bottom and furnished at the top with a knob *y*, serving as a handle for lifting the cover. The holder 1 for burs or drills carried in stock is boxlike in form, and has a forwardly inclined top 1ª which is provided with numerous numbered holes for the reception of burs or drills. Directly beneath, and parallel to, such inclined top 1ª, but separated therefrom by narrow spaces, is a two-part plate 3 and 3ª which serves as a support for the burs or drills, whose butts rest thereon as shown in Fig. 3.

As will be understood by reference to Figs. 2ª and 3, the portion of the plate indicated by the numeral 3 is spaced farther from the inclined top than the other portion or half 3ª, which arrangement is for the purpose of supporting burs of different lengths. In any case, the upper ends of the burs project above the inclined top 1ª, as shown in Fig. 3. The sterilizing portion of the apparatus is located directly in front of the inclined top 1ª, the front portion of the boxlike structure being there constructed as a narrow oblong tank, or compartment, 4, for holding sterilizing liquid. The depth of the latter is indicated in Fig. 2. A supplemental holder for burs or drills forms an attachment of this tank, the same consisting of a plate 5 having numerous numbered holes for burs or drills.

Directly beneath the perforated plate imperforate plates 6 and 6ª which are arranged different distances from the bur holder 5, as in the case of the main holder 1ª before described. Thus, this holder which is used in the sterilizing tank, is adapted for receiving and supporting burs of different lengths, as will be readily understood by reference to Fig. 2. The tank 4 is provided with a cover 7 shown detached in Fig. 5, the same having pendent end flanges 8 having holes 9. These pendent flanges are constructed of spring material and thus adapted to engage detachable spring catches 10 which are attached to the ends of the supplemental bur-holder 5.

As shown in Fig. 2, when the lid or cover 7 is in the normal position, its flanges 8 engage pins 11 which project inward from the upper ends of the spring catches 10. It is thus apparent that, by pulling on the handle 7ª of the lid 7, the bur-holder 5, with its attachments, may be raised out of the sterilizing liquid to the position indicated in Fig. 4; or it may be completely removed from the sterilizing tank if desired. In Fig. 3, the holder 5 is shown raised part way to the top. When completely raised, as shown in Fig. 4, the inner edge of the plate 5 abuts the lower edge of the incline or main holder 1ª, and the two plates having holes correspondingly numbered, it is apparent that burs may be conveniently removed from one to the other and placed in their appropriate holes with scarcely any liability of mistake. The catches 10 are provided with ribs or shoulders 10ª, the same being located near the top and on the outer side. The catches tend normally to swing outward, and hence when the holder 5 is raised to the top of the tank, the shoulders 10ª engage the upper edges of the ends of the tank and thus serve to support the holder so that the burs held therein are readily accessible for selection and use.

I will now further describe with a required detail the manner of using the apparatus. The stock holder 1ª is provided with holes which are divided into six groups or sections. These are numbered as required to indicate different classes of burs. Thus the numbers from ½ to 7 are for what are called round burs, and the numbers from 33½ to 40 are for inverted cone burs, while the 500 numbers are for cross-cut burs. All these numbers are in that portion of the incline 1ª which is directly over the bur supporting plate 3, and which serves for reception of what are called straight hand-piece burs. The right hand half of the inclined holder 1ª is similarly numbered, and serves for reception of what are called right-angle hand-piece burs. When the holder 1ª is filled, it has a complete stock of burs and the dentist can perceive at a glance every kind and size so that he can immediately select and remove any one without delay. The holder is also a great convenience for the dentist in respect to ordering new burs, since he may instantly ascertain what burs he is short of and will thus not be in danger of overstocking. When the sterilizer cover is in the position shown in Fig. 2, its pendent flanges 8 being engaged with the spring catches 10, it is apparent that, by seizing the handle 7ª and lifting slowly and steadily, the supplemental holder 5 with its attachments may be raised, as indicated in Fig. 3, until it reaches the position indicated in Fig. 4, when the shoulders 10ª of the catches will snap over the top edge of the tank. The dentist then selects and uses such burs or drills as his work requires. When the work is done or the burs are no longer required for use, the cover 7 is again applied and the holder 5 is lowered into the sterilizing liquid to the position shown in Fig. 2. In other words, when the dentist requires a sterilized bur, he has simply to lift the holder 5 and thus raise the burs out of the sterilizing solution.

In practice, the holder 5 used in the sterilizing tank is provided with holes numbered the same as the upper or stock holder 1ª. If the dentist starts out with his holder 1ª full of new burs and he desires to use one of them in operating on a patient, he takes out of the holder the bur he requires, say from No. 1, and uses it. Then, upon finding that he requires a No. 35, he takes the first bur out of the hand-piece and puts it in No. 1 in the sterilizing holder 5 which, as will be understood, has been previously raised to the position shown in Fig. 4; and at the same time, the dentist puts No. 35 in the hand-piece for use. He thus continues until he has used as many burs as he requires, constantly taking them first from the upper or main holder 1ª and placing them in the lower or sterilizing holder 5. When he has finished his work, all the burs in the lower part 5 are lowered into the sterilizing solution and left there until the next patient comes in. Then they are raised and ready for use and are perfectly clean and sanitary, since they have been completely immersed in the solution.

What I claim is:—

1. A holder for dental burs comprising a forwardly inclined plate and a rigid support therefor, such plate having numerous numbered perforations for receiving burs of different kinds and sizes, and a stepped or shouldered support for the burs, the same being made in sections and arranged directly under the inclined plate parallel thereto, one section being farther from said plate than the other, as described.

2. A sterilizer for dental implements, comprising a tank for the sterilizing liquid, a bur-holding plate provided with numerous holes duly numbered to indicate different kinds and sizes of burs, a support for the latter arranged under said plate, and spring catches attached to the ends of the plate and adapted for automatic engagement with the top edge of the tank when the aforesaid plate is raised out of the solution, as described.

3. In a sterilizer for dental implements, a tank for holding the sterilizing liquid, a plate provided with numerous numbered perforations for reception of burs, the plate being adapted to be raised and lowered in the tank, and spring catches applied to the ends of the plate, their upper free ends being provided with outwardly projecting shoulders adapted, when the plate is raised, for automatic engagement with and subsequent support of the plate in the position required for access to the burs, as described.

4. The combination with a sterilizing tank and a perforated plate adapted for holding burs and provided with spring catches, of a lid or cover for the tank provided with pendent portions adapted for detachable engagement with such spring catches, as described.

HOWARD JOHNSON FRIES.

Witnesses:
  M. J. WILLETT,
  JOHN P. HARTMAN,